US 11,144,238 B1

(12) United States Patent
Raz et al.

(10) Patent No.: US 11,144,238 B1
(45) Date of Patent: Oct. 12, 2021

(54) BACKGROUND PROCESSING DURING REMOTE MEMORY ACCESS

(71) Applicant: Next Silicon Ltd, Tel Aviv (IL)

(72) Inventors: Elad Raz, Ramat Gan (IL); Yaron Dinkin, Tel Aviv-Jaffa (IL)

(73) Assignee: Next Silicon Ltd, Tel Aviv (IL)

( * ) Notice: Subject to any disclaimer, the term of this patent is extended or adjusted under 35 U.S.C. 154(b) by 0 days.

(21) Appl. No.: 17/141,267

(22) Filed: Jan. 5, 2021

(51) Int. Cl.
   *G06F 12/00* (2006.01)
   *G06F 3/06* (2006.01)
   *G06F 13/00* (2006.01)
   *G06F 13/28* (2006.01)

(52) U.S. Cl.
   CPC .......... *G06F 3/0655* (2013.01); *G06F 3/0604* (2013.01); *G06F 3/0676* (2013.01); *G06F 3/0677* (2013.01); *G06F 3/0679* (2013.01)

(58) Field of Classification Search
   CPC .... G06F 3/0604; G06F 3/0677; G06F 3/0676; G06F 3/0655
   See application file for complete search history.

(56) References Cited

U.S. PATENT DOCUMENTS

| | | | | |
|---|---|---|---|---|
| 2004/0098373 | A1* | 5/2004 | Bayliss | G06F 16/24532 |
| 2010/0094933 | A1* | 4/2010 | Hickson | G06Q 10/06 709/204 |
| 2013/0179733 | A1* | 7/2013 | Frank | G06F 11/261 714/29 |
| 2021/0029219 | A1* | 1/2021 | Kamran | H04L 67/325 |

* cited by examiner

*Primary Examiner* — Mark A Giardino, Jr.

(57) ABSTRACT

An apparatus for executing a software program, comprising at least one hardware processor configured for: identifying in a plurality of computer instructions at least one remote memory access instruction and a following instruction following the at least one remote memory access instruction; executing after the at least one remote memory access instruction a sequence of other instructions, where the sequence of other instructions comprises a return instruction to execute the following instruction; and executing the following instruction; wherein executing the sequence of other instructions comprises executing an updated plurality of computer instructions produced by at least one of: inserting into the plurality of computer instructions the sequence of other instructions or at least one flow-control instruction to execute the sequence of other instructions; and replacing the at least one remote memory access instruction with at least one non-blocking memory access instruction.

11 Claims, 7 Drawing Sheets

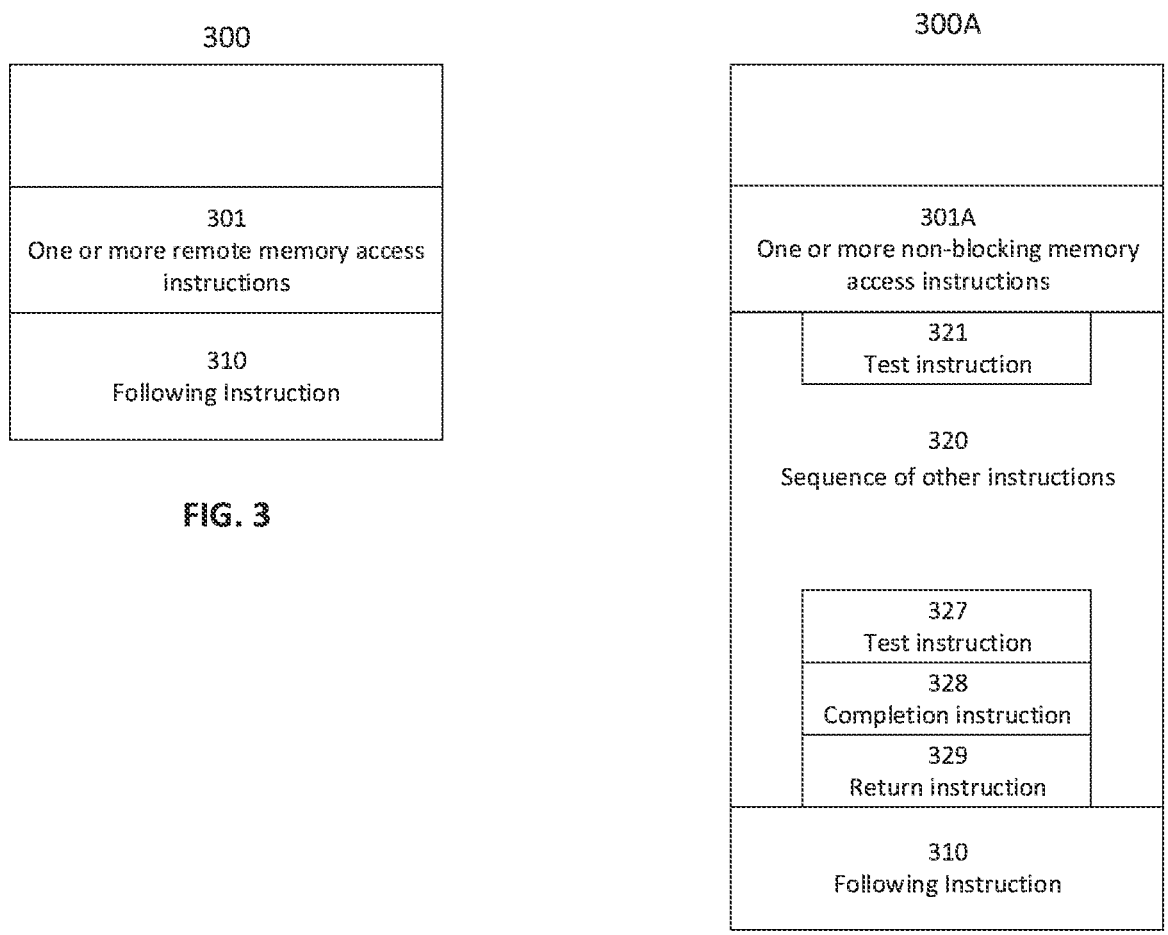

BACKGROUND PROCESSING DURING REMOTE MEMORY ACCESS

FIELD AND BACKGROUND OF THE INVENTION

Some embodiments described in the present disclosure relate to a computerized system and, more specifically, but not exclusively, to a computerized system with a remote memory component.

In some computerized systems an amount of time for a hardware processor to access a memory location is not dependent on which memory location is accessed. For example, in a system where the hardware processor is electrically coupled to a memory component using a bus, an amount of time for a read instruction to complete is typically not dependent on which memory address is read.

However, there exist other systems where an amount of time for an execution to complete depends on which memory address is accessed. For example, there exist systems where a plurality of hardware processors use a shared memory address space. In such systems, the shared memory address space is distributed between a plurality of memory components, each electrically coupled to one of the plurality of hardware processors. In such systems, a hardware processor may access a memory address in a memory component electrically coupled thereto via a bus, however the same hardware processor may access another memory address in another memory component electrically coupled to another of the plurality of hardware processors via a remote memory access processing circuitry. In such systems, an access to the memory address may complete in a first access time and another access to the other memory address may complete in a second access time. As the other memory component is not electrically coupled to the hardware processor, i.e. the other memory component is remote to the hardware processor, the second access time may be greater than the first access time by at least an order of magnitude. For example, the first access time, via a bus, may be measured in tens of clock cycles, where the second access time, via a remote memory access processing circuitry, may be measured in hundreds of clock cycles. In some systems the second access time may exceed 1000 cycles.

There exist systems where a remote memory access instruction is synchronous by nature, i.e. the hardware processor does not execute additional instructions of a program until the memory access instruction completes, for example by stalling or by executing a no-operation (NOP) instruction. As a result, when the hardware processor accesses a remote memory address, via a remote memory access processing circuitry, the hardware processor may not execute additional instructions for hundreds of clock cycles waiting for a remote memory access instruction to complete.

SUMMARY OF THE INVENTION

The present disclosure, in some embodiments herewithin, describes an apparatus and a method for utilizing a hardware processor while the hardware processor is waiting for a remote memory access instruction to complete, i.e. for executing by the hardware processor a sequence of other computer instructions while the hardware processor is waiting for the remote memory access instruction to complete.

The foregoing and other objects are achieved by the features of the independent claims. Further implementation forms are apparent from the dependent claims, the description and the figures.

According to a first aspect of the invention, an apparatus for executing a software program comprises at least one hardware processor configured for: identifying in a plurality of computer instructions at least one remote memory access instruction, and a following instruction following the at least one remote memory access instruction; executing after the at least one remote memory access instruction a sequence of other instructions, where the sequence of other instructions comprises a return instruction to execute the following instruction; and executing the following instruction. According to the first aspect of the invention executing the sequence of other instructions comprises executing an updated plurality of computer instructions produced by at least one of: inserting into the plurality of computer instructions the sequence of other instructions or at least one flow-control instruction to execute the sequence of other instructions; and replacing the at least one remote memory access instruction with at least one non-blocking memory access instruction. Executing a sequence of other instructions after the at least one remote memory access instruction reduces an amount of time the at least one hardware processor is stalled while waiting for the at least one remote memory access instruction to complete, thus increasing throughput of the at least one hardware processor.

According to a second aspect of the invention, a method for executing a software program comprising a plurality of basic blocks, comprises: identifying in a plurality of computer instructions at least one remote memory access instruction, and a following instruction following the at least one remote memory access instruction; executing after the at least one remote memory access instruction a sequence of other instructions, where the sequence of other instructions comprises a return instruction to execute the following instruction; and executing the following instruction. According to the second aspect of the invention executing the sequence of other instructions comprises executing an updated plurality of computer instructions produced by at least one of: inserting into the plurality of computer instructions the sequence of other instructions or at least one flow-control instruction to execute the sequence of other instructions; and replacing the at least one remote memory access instruction with at least one non-blocking memory access instruction.

With reference to the first and second aspects, in a first possible implementation of the first and second aspects of the present invention the at least one hardware processor is further configured for compiling the updated plurality of computer instructions to produce a plurality of machine level instructions; and executing the updated plurality of computer instructions comprises executing the plurality of machine level instructions. Optionally, the at least one hardware processor is further configured for configuring at least one other hardware processor to execute the updated plurality of computer instructions by executing the plurality of machine level instructions. Configuring the at least one other hardware processor to execute the plurality of machine level instructions produced by compiling the updated plurality of computer instructions produce increases control of what tasks are executed when the at least one hardware processor is waiting for the at least one remote memory access instruction to complete, thus increasing usability of a system implemented according to the present disclosure.

With reference to the first and second aspects, in a second possible implementation of the first and second aspects of the present invention the at least one hardware processor is further configured for executing at least some of the sequence of other instructions in response to receiving at least one signal from a remote memory access processing circuitry; and the remote memory access processing circuitry generates the at least one signal in response to the at least one hardware processor executing the at least one remote memory access instruction. Executing at least some of the sequence of other instructions in response to receiving a signal generated by the remote memory access processing circuitry allows identifying a remote memory access instruction at runtime without modifying a code executed by the at least one hardware processor, increasing usability of a system implemented according to the present disclosure.

With reference to the first and second aspects, in a third possible implementation of the first and second aspects of the present invention the at least one hardware processor is further configured for: after executing the at least one remote memory access instruction, generating an exception signal subject to identifying a target of the at least one remote memory access instruction is not ready; and executing at least some of the sequence of other instructions in response to receiving the exception signal. Executing at least some of the sequence of other instructions in response to an exception signal generated subject to identifying that the target is not ready reduces an amount of latency between completion of the at least one remote memory access instruction and the at least one hardware processor processing an outcome of executing the at least one remote memory access instruction, compared to executing the at least some of the sequence of other instructions regardless of whether the target is ready or not. Optionally, the sequence of other instructions comprises at least one test instruction for accessing a remote memory access processing circuitry. Optionally, the at least one hardware processor is further configured for executing at least some of the sequence of other instructions subject to a result of executing the at least one test instruction.

With reference to the first and second aspects, in a fourth possible implementation of the first and second aspects of the present invention the sequence of other instructions comprises at least one completion instruction associated with the at least one remote memory access instruction. Optionally, the at least one remote memory access instruction comprises at least one output operand for storing an outcome value, where the outcome value is an outcome of a first access to the remote memory access processing circuitry. Optionally, the at least one completion instruction comprises at least one input-output operand for receiving at least one input value and for storing another outcome value, where the other outcome value is an outcome of a second access to the remote memory access processing circuitry. Optionally, the at least one hardware processor is further configured for providing the at least one outcome value as input to the at least one completion instruction via the at least one input-output operand. Optionally, the outcome value is encoded to comprise an identification value indicative of at least one remote memory access request executed using the at least one remote memory access instruction. Optionally, the at least one hardware processor is further configured for: extracting the identification value from the outcome value, and executing the at least one completion instruction comprising performing the second access to the remote memory access processing circuitry according to the identification value. Optionally, performing the second access to the remote memory access processing circuitry according to the identification value comprises storing in the at least one input-output operand at least one of: at least one retrieved value, retrieved from a remote memory component by the remote memory access processing circuitry in response to the first access thereto, and at least one input value of the at least one output operand of the at least one remote memory access instruction. Encoding in an outcome value of the at least one remote memory access instruction an identification value for use in the at least one completion instruction allows associating the at least one remote memory access instruction with the at least one completion instruction. Using a common operand for providing the at least one outcome value of the at least one remote memory access instruction to the at least one completion instruction allows associating the at least one remote memory access instruction with the at least one completion instruction while using existing instruction formats, increasing usability of a system implemented according to the present disclosure compared to using bespoke memory access instructions.

With reference to the first and second aspects, in a fifth possible implementation of the first and second aspects of the present invention executing the following instruction is subject to identifying a target of the at least one remote memory access instruction is ready. Optionally, the sequence of other instructions comprises at least one other test instruction for accessing a remote memory access processing circuitry; and wherein identifying the target of the at least one remote memory access instruction is ready is according to an outcome of executing the at least one other test instruction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL
VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 3 is a schematic block diagram of an exemplary plurality of computer instructions, according to some embodiments;

FIGS. 3A, 3B and 3C are schematic block diagrams of exemplary updated pluralities of computer instructions, according to some embodiments;

DESCRIPTION OF SPECIFIC EMBODIMENTS OF THE INVENTION

Figure 1:
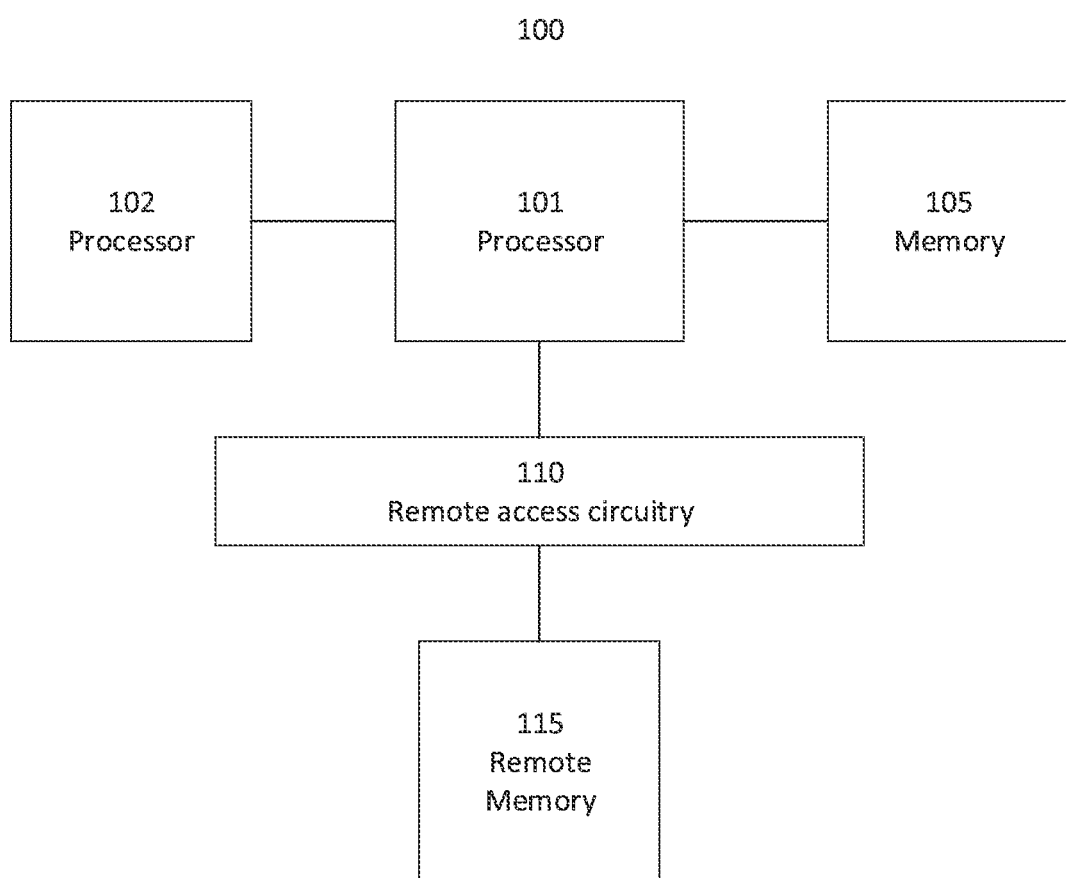
FIG. 1 is a schematic block diagram of an exemplary apparatus, according to some embodiments.

For brevity, henceforth the term "instruction" is used to mean "computer instruction" and the terms are used interchangeably.

In addition, for brevity the term "stall" is used to mean any situation where a hardware processor must discard content of an instruction pipeline, and additionally or alternatively must defer execution of any instruction that performs a computation, for example any instruction that is not a NOP instruction.

Throughput of a hardware processor is an amount of identified operations the hardware processor performs in a time interval, for example an amount of computer instructions executed by the hardware processor in the time interval. When the hardware processor is stalled, its throughput decreases. There exist a variety of methods for reducing an amount of time a hardware processor is stalled, for example using an instruction pipeline.

However, when a hardware processor executes a plurality of computer instructions of a software program comprising one or more remote memory access instructions, it may be that a following instruction following a remote memory access instruction depends on an outcome of the remote memory access instruction. Even with an instruction pipeline the hardware processor may stall until the remote memory access instruction completes as an amount of time required for the remote memory access instruction to complete may be greater than supported by the instruction pipeline.

In addition, even when the hardware processor does not stall until the remote memory access instruction completes, existing solutions do not allow the software program to control what is executed while the remote memory access instruction has not completed.

The present disclosure proposes, in some embodiments described herewithin, executing a remote memory access instruction asynchronously and optionally configuring the hardware processor to perform an identified task while the remote memory access instruction completes.

Optionally, the identified task is a management task of the hardware processor. Optionally, the identified task is a task of the software program, other than the task comprising the remote memory access instruction. Optionally, the identified task is selected before executing the software program, for example when compiling the software program. Optionally, the identified task is selected by the hardware processor while executing the software program, for example when identifying the remote memory access instruction is executing. Optionally, to perform the identified task while waiting for the remote memory access instruction to complete, one or more instructions for performing the identified task are added to a plurality of instructions executed by the software program. Optionally, the hardware processor is configured to perform the identified task in response to receiving a signal indicative of the remote memory access instructions.

In some embodiments described herewithin, the present disclosure proposes configuring the hardware processor for executing all memory access instructions asynchronously.

Optionally, the hardware processor is configured for identifying a memory access instruction as a remote memory access instruction and executing the remote memory access instruction asynchronously. In some other embodiments, the present disclosure proposes replacing the remote memory access instruction with one or more asynchronous remote memory access instructions. A memory access instruction may be identified as a remote memory access instruction before executing the software program, for example when compiling the software program. A memory access instruction may be identified as a remote access instruction when executing the software program. Optionally, the memory access instruction is identified as the remote memory access instruction according to a value of a memory address operand of the memory access instruction, indicative of a remote memory access.

To reduce an amount of time the hardware processor, executing a plurality of computer instructions comprising one or more memory access instructions, is stalled while waiting for a remote memory access instruction to complete the present disclosure proposes, in some embodiments described herewithin, executing after the one or more remote memory access instructions a sequence of other instructions comprising a return instruction to execute the following instruction. Optionally, by executing the sequence of other instructions the hardware processor performs another task while waiting for the one or more remote memory access instructions to complete. For example, by executing the sequence of other instructions the hardware processor may perform a management task thereof or a task of a computer program comprising the plurality of computer instructions. Thus, in such embodiments, the hardware processor executes the one or more remote memory access instructions, next executes the sequence of other instructions, and next executes the following instruction, and optionally followed by one or more additional instructions. Optionally, the hardware processor executes the following instruction subject to identifying a target of the one or more remote memory instructions is ready. Executing the sequence of other instructions before the one or more remote memory access instructions complete facilitates reducing an amount of time the hardware processor is stalled, thus increasing throughput of the hardware processor. In addition, executing the sequence of other instructions allows control, by the software program and additionally or alternatively by an administrator of a system, of what is executed while the remote memory access instruction has not completed.

Optionally, executing the sequence of other instructions comprises executing an updated plurality of instructions. Optionally, producing the updated plurality of instructions comprises inserting the sequence of other instructions into the plurality of computer instructions. Optionally, producing the updated plurality of instructions comprises inserting into the plurality of computer instructions a flow-control instruction to execute the sequence of other instructions. Some examples of a flow-control instruction are a conditional branch instruction, a jump instruction (an unconditional branch instruction) and a function call instruction. Another example of a flow-control instruction is an instruction that triggers generation of a signal, some examples being an exception signal, an interrupt signal, and a fault signal. Optionally the flow-control instruction diverts flow of execution of the software program from the plurality of instructions to the sequence of other instructions and then back to the following instruction (for example by executing the return instruction). Optionally, the flow of execution of the software program returns to an instruction executed before executing the flow-control instructions. A non-blocking memory access instruction is a memory access instruction that when executed by the hardware processor allows the hardware processor to execute one or more other instructions before the non-blocking memory instruction completes executing. Optionally, producing the updated plurality of instructions comprises replacing the one or more remote memory access instructions with one or more non-blocking memory access instructions. Optionally, producing the updated plurality of instructions comprises configuring the hardware processor to the one or more remote memory access instruction as one or more non-blocking memory access instructions. Replacing the one or more remote memory access instructions with one or more non-blocking memory access instructions facilitates reducing an amount of time the hardware processor is blocked, i.e. is stalled, and thus increases throughput of the hardware processor.

Optionally, the updated plurality of instructions is produced at compile time, where executing the updated plurality of computer instructions comprises executing a plurality of machine level instructions produced by compiling the updated plurality of instructions. Optionally, the hardware processor compiles the updated plurality of instructions at runtime, when executing the plurality of computer instructions of the software program. This is known also as just-in-time (JIT) compilation. Optionally, the hardware processor compiles the updated plurality of instructions out-of-band, before beginning execution of the plurality of computer instructions. Optionally, another hardware processor compiles the updated plurality of instructions.

In addition, in some embodiments described herewithin, accessing a remote memory address comprises a completion instruction in addition to a remote memory access instruction. For example, in some embodiments in response to receiving a remote memory access instruction, for example a non-blocking memory instruction, the remote memory access processing circuitry stores a value retrieved from the second memory, then the hardware processor executes a completion instruction to retrieve the value from the remote memory access processing circuitry. Optionally, the sequence of other instructions comprises one or more completion instructions each associated with one of the one or more remote memory address instructions. In some embodiments the hardware processor may have more than one non-blocking memory access instruction outstanding. In such embodiments there is a need to associate an outcome of executing a remote memory access instruction with the remote memory access instruction, for example for the purpose of retrieving the value from the remote memory access processing circuitry. Optionally, an outcome value of executing a remote memory access instruction is encoded to comprise an identification value indicative of a remote memory request executed using one of the one or more remote memory instruction. Optionally, the hardware processor is configured to extract the identification value from the outcome value and to execute a completion instruction based on the identification value. Optionally executing the completion instruction comprises performing a second access to the remote memory access processing circuitry according to the identification value. Optionally, an operand of the remote memory access instruction for storing an outcome of executing thereof is an input operand of the respective associated completion instruction. Using an operand common to a remote memory access instruction and respective associated completion instruction to encode information identifying a remote memory request allows leaving unchanged other parts of the plurality of computer instructions that are not involved with remote memory access. For example, error handling and recovery may semantics that are common to both the case where executing the completion instruction accesses the remote memory access processing circuitry and the case where executing the completion instruction does not access the remote memory access processing circuitry. Leaving the other parts of the plurality of computer instructions unchanged reduces complexity of the updated plurality of computer instructions and increases usability of the updated plurality of computer instructions on systems with a variety of remote memory access processing circuitries.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary apparatus 100, according to some embodiments. In such embodiments, one or more hardware processor 101 is electrically coupled to memory 105 via a bus. Memory 105 is optionally static random access memory (SRAM). Memory 105 is optionally dynamic random access memory (DRAM). Another example of a memory coupled via a bus is non-volatile random access memory (NVRAM).

For brevity, henceforth the term "processing unit" is used to mean one or more hardware processors, and the terms are used interchangeably. In addition, for brevity the term "remote access circuitry" is used to mean "remote memory access processing circuitry" and the terms are used interchangeably.

Optionally, remote memory processing unit 101 is connected to remote memory 115, optionally via processing circuitry for access thereof, for example remote access processing circuitry 110. Optionally remote memory 115 is SRAM. Other examples of a remote memory are DRAM, NVRAM, and electrically erasable programmable read-only memory (EEPROM). Optionally, remote access circuitry 105 implements Joint Electron Device Engineering Council (JEDEC) High Bandwidth Memory interface. Optionally, remote access circuitry comprises an input-output interface to an expansion bus, for example Peripheral Component Interface Express (PCIe). Optionally, the expansion bus is a proprietary bus.

Optionally, processing unit 101 is connected to other processing unit 102, optionally for the purpose of configuring processing unit 101.

To execute a software program, in some embodiments apparatus 100 implements the following optional method.

Figure 2:
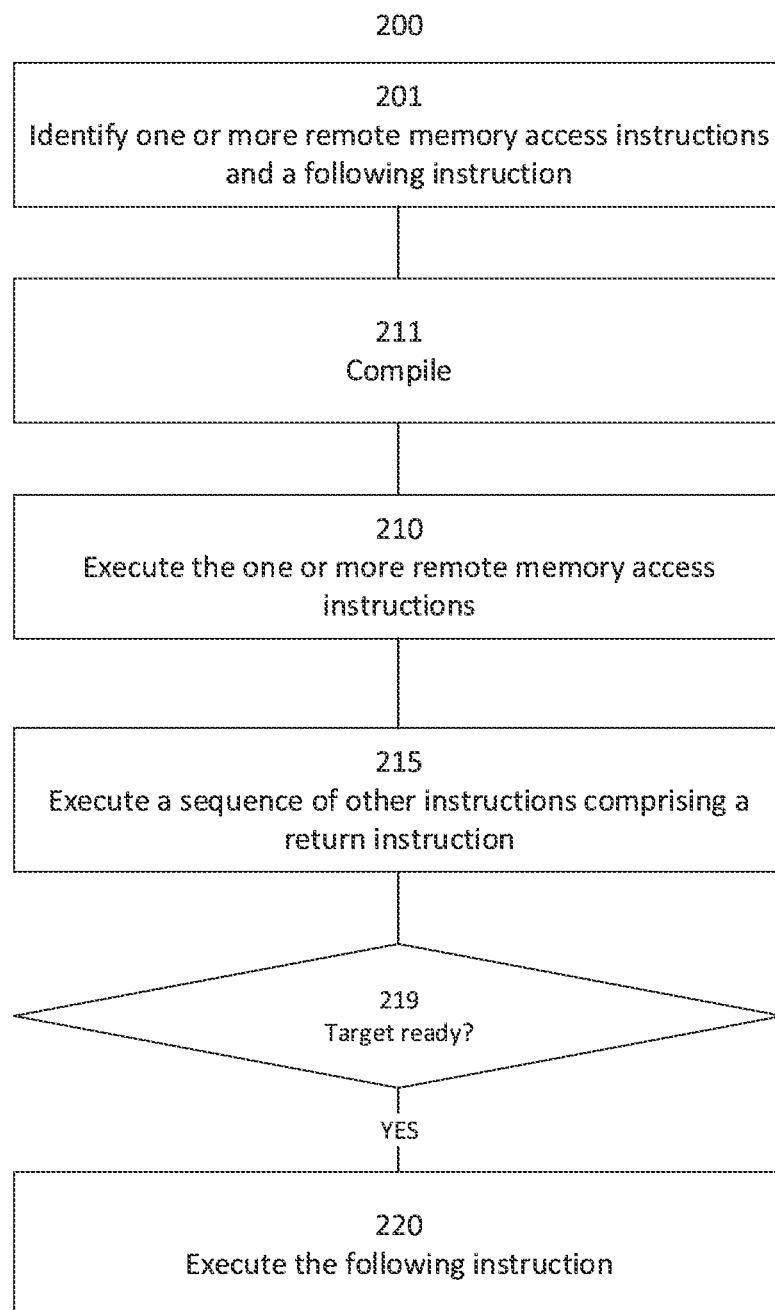
FIG. 2 is a flowchart schematically representing an optional flow of operations for executing a software program, according to some embodiments.

Reference is now made also to FIG. 2, showing a flowchart schematically representing an optional flow of operations 200 for executing a software program, according to some embodiments.

Reference is now made also to FIG. 3, showing a schematic block diagram of an exemplary plurality of computer instructions 300, according to some embodiments. In such embodiments the software program comprises plurality of computer instructions 300. Optionally, plurality of computer instructions 300 comprises one or more remote memory access instructions 301 and a following instruction 310, where following instruction 310 follows one or more remote memory access instruction 301.

Reference is now made again to FIG. 2. In such embodiments, in 201 processing unit 101 identifies in plurality of computer instructions 300 one or more remote memory access instructions 301 and following instruction 301. Optionally, in 210 processing unit 101 executes one or more remote memory access instructions 301 and in 215 processing unit 101 optionally executes a sequence of other instructions. Optionally, executing the sequence of other instructions comprises executing a plurality of updated computer instructions.

Figure 3B:
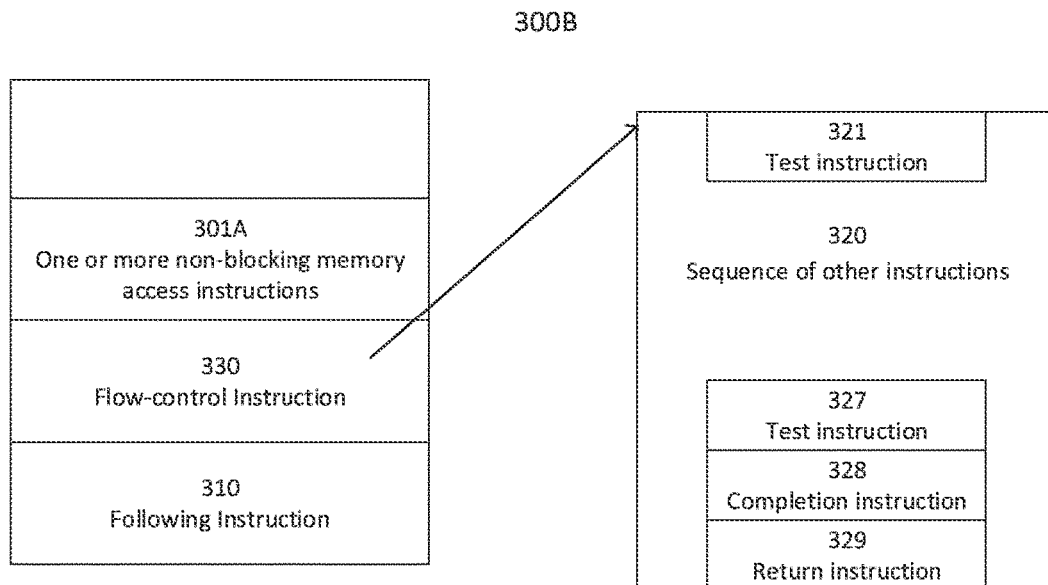
Figure 3C:
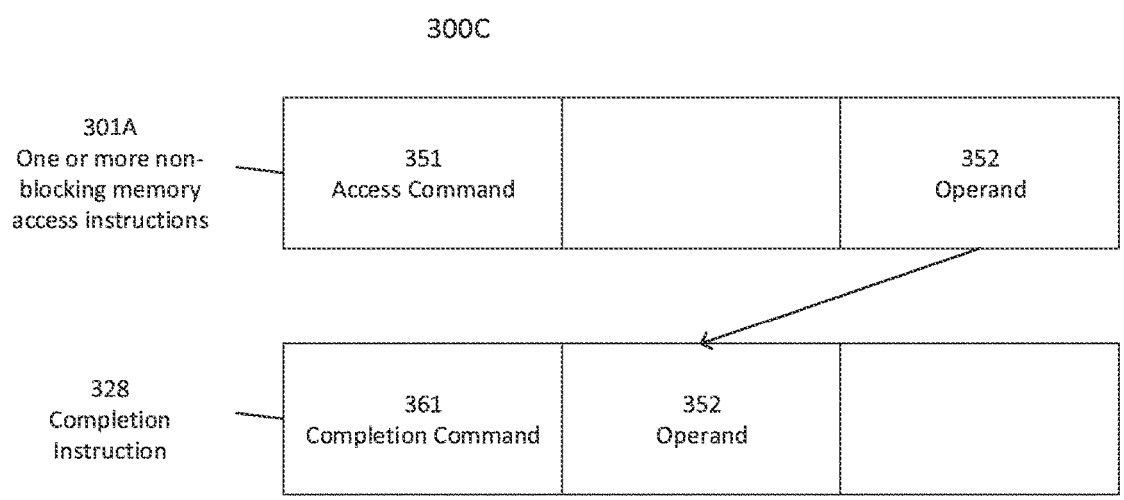

Reference is now made also to FIGS. 3A, 3B, and 3C, showing schematic block diagrams of exemplary updated pluralities of computer instructions 300A, 300B and 300C respectively, according to some embodiments. Referring now to FIG. 3A, in some embodiments updated plurality of computer instructions 300A is produced by replacing one or more remote memory access instructions 301 with one or more non-blocking memory access instructions 301A. Additionally, or alternatively, producing updated plurality of computer instructions 300A comprises inserting into plurality of computer instructions 300 a sequence of other instructions 320. Optionally, sequence of other instructions 320 is inserted after one or more remote memory access instructions 301 or one or more non-blocking memory access instructions 301A. Optionally, sequence of other instructions 320 is inserted before following instruction 310.

Optionally, sequence of other instructions 320 comprises one or more test instructions 321, optionally for accessing remote access circuitry 110. Optionally, sequence of other instructions 320 comprises a return instruction 329. Optionally, return instruction 329 is an instruction to execute following instruction 310. Optionally, sequence of other instructions 320 comprises one or more other test instructions 327, optionally for accessing remote access circuitry 110.

Referring now also to FIG. 3B, in some other embodiments producing updated plurality of computer instructions 300A comprises inserting into plurality of computer instructions 300 one or more flow-control instructions 330. Optionally one or more flow-control instructions 330 are one or more instructions to execute sequence of other instructions 320.

Referring now again to FIG. 3A. Optionally, sequence of other instructions 320 comprises one or more completion instructions 328, optionally for completing one or more memory access requests associated with one or more non-blocking memory access instructions 301A. Optionally, an association between one or more non-blocking memory access instructions 301A and one or more completion instructions 328 is via a shared physical operand, for example a register of processing unit 101 or a memory location in memory 105.

Referring now also to FIG. 3C. Optionally, one or more non-blocking memory access instructions 301A comprise one or more access command 351. Some examples of an access command are load and store. Optionally, one or more non-blocking memory access instructions 301A comprise one or more output operand 352, for storing an outcome value. Optionally, the outcome value is an outcome of a first access to remote access circuitry 110, for example when executing one or more non-blocking memory access instructions 301A. Optionally, one or more completion instructions 328 comprise one or more completion command 361. Some examples of a completion command are complete-load and complete-store. Optionally, the completion command is a member of an instruction set of processing unit 101. Optionally, one or more completion instructions 328 comprise one or more input-output operands, for the purpose of storing another outcome value. Optionally, the other outcome value is an outcome value of a second access to remote access circuitry 110, for example when executing one or more completion instruction 328. Optionally, the outcome value is provided as an input value to one or more completion instructions 328 via the one or more input-output operands. Optionally, one or more output operands 352 of one or more non-blocking memory access instructions 301A are provided to one or more completion instruction 328 as the one or more input-output operands thereof. Optionally, one or more completion instruction 328 receives the outcome value as an input value via one or more output operands 352, serving as one or more input-output operands thereof.

Optionally, the outcome value is encoded to comprise an identification value indicative of one or more memory access requests executed using one or more remote memory access instructions 301 or one or more non-blocking memory access instructions 301A. Some examples of an identification value are a transaction identification value, a key value to a key-value store, and information indicative of one or more access command 351. Optionally, the outcome value is encoded to comprise a hash value computed using the identification value. Optionally, the outcome value is encoded to comprise processor-specific information, for example a distinctive unique value (sometimes known as a magic value), a position counter, and some bits of a position counter.

Reference is now made again to FIG. 2.

Optionally, the updated plurality of computer instructions executed in 215 is any one of updated plurality of computer instructions 300A and updated plurality of computer instructions 300B. Optionally, the updated plurality of computer instructions is generated by processing unit 101. Optionally, in 211 processing unit 101 compiles the updated plurality of computer instructions to produce a plurality of machine level instructions. Optionally, in 215 executing the updated plurality of computer instructions comprises processing unit 101 executing the plurality of machine level instructions.

Optionally, the updated plurality of computer instructions is generated by other processing unit 102, optionally including executing 211 and additionally or alternatively executing 201 by other processing unit 102. Optionally, other processing unit 102 configures processing unit 101 to execute the updated plurality of computer instructions. Optionally, other processing unit 102 configures processing unit 101 to execute the updated plurality of computer instructions by executing the plurality of machine level instructions produced in 211.

In 220, processing unit 101 optionally executes following instruction 310. Optionally, processing unit 101 executes following instruction 310 subject to determining in 219 that a target of one or more remote memory access instructions 301 is ready.

Optionally, processing unit 101 receives one or more signals from remote access circuitry 110.

Figure 4:
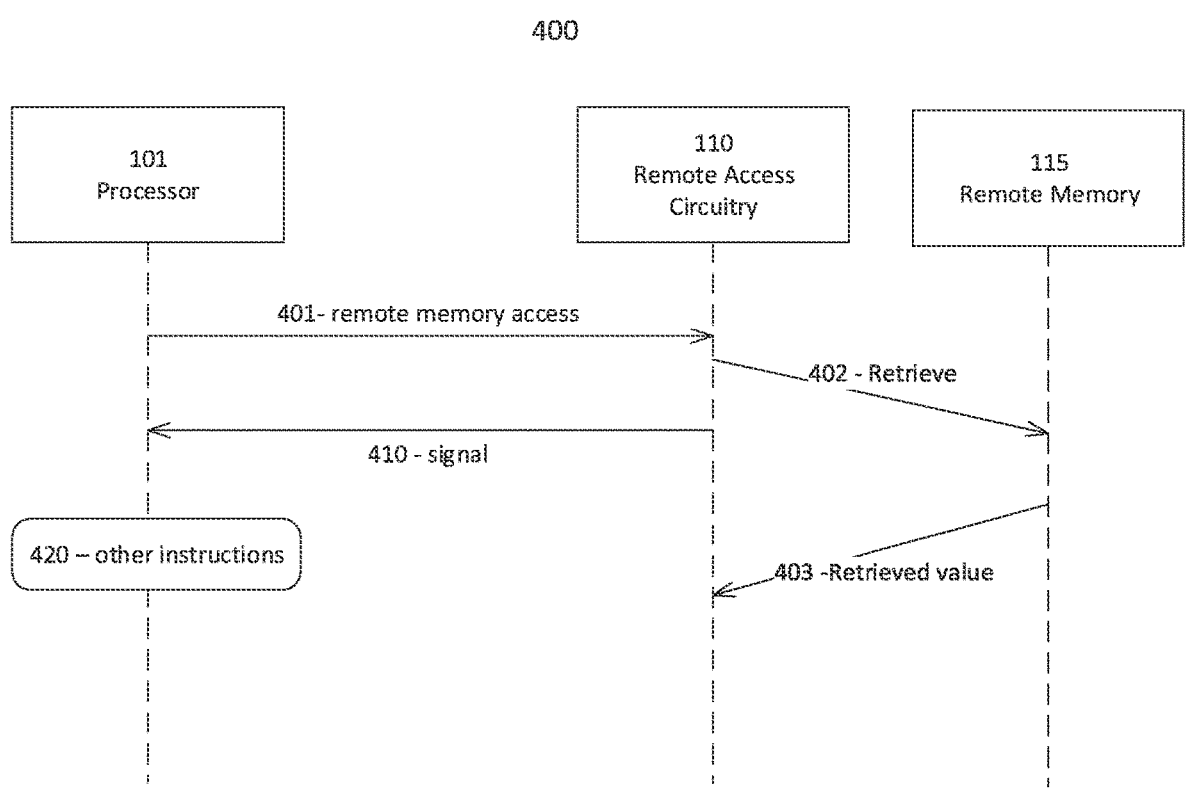
FIG. 4 is a sequence diagram of an optional flow of operations, according to some embodiments.

Reference is now made also to FIG. 4, showing a sequence diagram of an optional flow of operations 400, according to some embodiments. In such embodiments, in 401 processing unit 101 accesses remote access circuitry 110, for example by executing one or more remote memory access instructions 301 or one or more non-blocking memory access instructions 301A. Optionally, remote access circuitry 110 accessing remote memory 115 in 402 to retrieve in 403 one or more retrieved values, optionally in response to remote memory access 401. Optionally, remote access circuitry 110 generates one or more signals 410 in response to remote memory access 401. Optionally, processing unit 101 receives one or more signals 410, and in 420 processing unit 101 optionally executes at least some of plurality of other instructions 320 in response thereto.

Optionally, processing unit 101 polls remote access circuitry 110.

Figure 5:
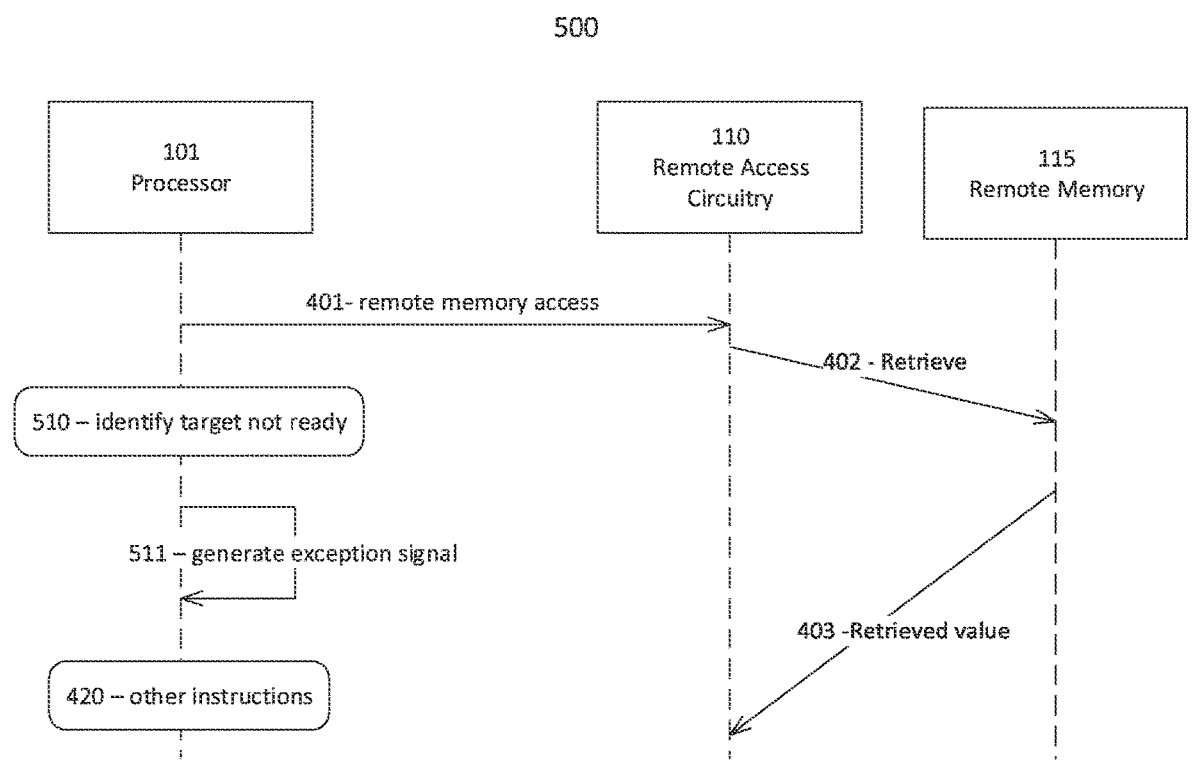
FIG. 5 is a sequence diagram of another optional flow of operations, according to some embodiments.

Reference is now made also to FIG. 5, showing a sequence diagram of another optional flow of operations 500, according to some embodiments. In such embodiments, after accessing remote access circuitry 110 in 401, processing unit 101 identifies in 510 that the target of one or more remote memory access instructions 301 is not ready, for example by executing one or more test instructions 321. Optionally processing unit 101 executes one or more test instructions 321 to determine a completion status of executing one or more non-blocking memory access instructions 301A. Optionally, processing unit 101 executes one or more test instructions 321 in each of a plurality of polling iterations. Optionally, processing unit 101 executes the at least some of plurality of other instructions 320 in 420 in response to a result of executing one or more test instructions 321. Optionally, processing unit 101 executes flow-control instruction 330 after executing one or more test instructions 321. Optionally, executing the at least some of plurality of other instructions 320 in response to a result of executing one or more test instructions 321 comprises executing flow-control instruction 330.

Optionally, after identifying in 510 that the target of one or more remote memory access instructions 301 is not ready, in 511 processing unit 101 generates an exception signal, for example a fault signal thereof. Optionally, processing unit 101 receives the exception signal. Optionally, processing unit 101 executes the at least some of plurality of other instructions 320 in 420 in response to receiving the exception signal.

Reference is now made again to FIG. 2.

Optionally, in 201 processing unit 101 identifies one or more remote memory access instructions 301 according to one or more signals 410.

Optionally, in 219 processing unit 101 identifies that target of one or more remote memory access instructions 301 is ready according to one or more signals 410, optionally interrupting execution of sequence of other computer instructions 320 such that processing unit 101 executes some of sequence of other computer instructions 320 and not all of sequence of other computer instructions 320.

Optionally, in 219 processing unit 101 identifies that target of one or more remote memory access instructions 301 is ready according to an outcome of executing one or more test instructions 321 and additionally or alternatively according to another outcome of executing one or more other test instructions 327.

When sequence of other instructions 320 comprises one or more completion instructions 328, apparatus may implement the following flow of operations.

Figure 6:
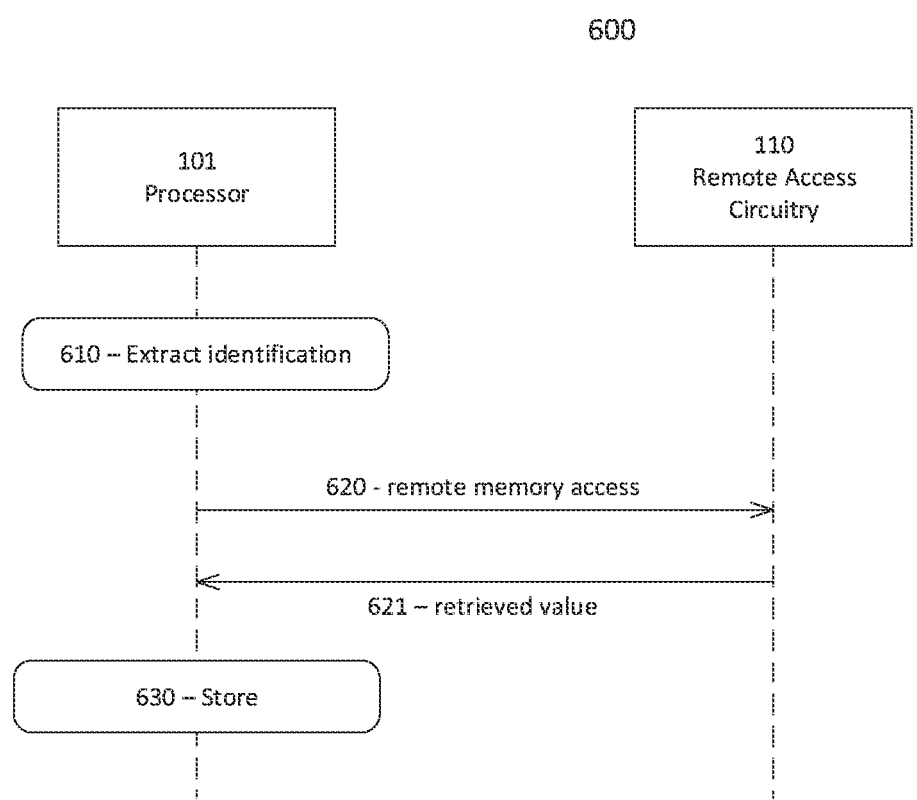
FIG. 6 is a sequence diagram of yet another optional flow of operations, according to some embodiments.

Reference is now made also to FIG. 6, showing a sequence diagram of yet another optional flow of operations 600, according to some embodiments. In such embodiments, in 610 processing unit 101 extracts the identification value from the outcome value in one or more output operand 352. Optionally, processing unit 101 executes one or more completion instruction 328. Optionally, executing one or more completion instruction 328 comprises processing unit 101 accessing remote access circuitry 110 in 620, and optionally retrieving in 621 one or more retrieved values, optionally retrieved by remote access circuitry 110 from remote memory 115 in 403. Optionally, in 630 processing unit 101 stores the one or more retrieved values in the one or more input-output operands of one or more completion instruction 328, for example in one or more output operands 352. Optionally, when one or more access commands 351 is a store command, one or more output operand 352 is a source register operand of one or more non-blocking memory access instructions 301A, providing one or more input values thereto. To restore the source register operand to an original value thereof, in 630 processing unit 101 optionally stores in the one or more input-output operands the one or more input values of one or more output operand 352.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant remote memory access instructions and remote memory access processing circuitries will be developed and the scope of the terms "remote memory access instruction" and "remote memory access processing circuitry" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for executing a software program, comprising at least one hardware processor configured for:
    identifying in a plurality of computer instructions at least one remote memory access instruction, and a following instruction following the at least one remote memory access instruction, where the at least one remote memory access instruction comprises at least one output operand for storing an outcome value, where the outcome value is an outcome of a first access to a remote memory access processing circuitry;
    executing after the at least one remote memory access instruction a sequence of other instructions, where the sequence of other instructions comprises a return instruction to execute the following instruction and at least one completion instruction associated with the at least one remote memory access instruction and comprising at least one input-output operand for receiving at least one input value and for storing another outcome value, where the other outcome value is an outcome of a second access to the remote memory access processing circuitry;
    providing the outcome value as input to the at least one completion instruction via the at least one input-output operand; and
    executing the following instruction;
    wherein executing the sequence of other instructions comprises executing an updated plurality of computer instructions produced by at least one of:
        inserting into the plurality of computer instructions the sequence of other instructions or at least one flow-control instruction to execute the sequence of other instructions; and
        replacing the at least one remote memory access instruction with at least one non-blocking memory access instruction.

2. The apparatus of claim 1, wherein the at least one hardware processor is further configured for compiling the updated plurality of computer instructions to produce a plurality of machine level instructions; and
    wherein executing the updated plurality of computer instructions comprises executing the plurality of machine level instructions.

3. The apparatus of claim 2, wherein the at least one hardware processor is further configured for configuring at least one other hardware processor to execute the updated plurality of computer instructions by executing the plurality of machine level instructions.

4. The apparatus of claim 1, wherein the at least one hardware processor is further configured for executing at least some of the sequence of other instructions in response to receiving at least one signal from the remote memory access processing circuitry; and
    wherein the remote memory access processing circuitry generates the at least one signal in response to the at least one hardware processor executing the at least one remote memory access instruction.

5. The apparatus of claim 1, wherein the at least one hardware processor is further configured for:
    after executing the at least one remote memory access instruction, generating an exception signal subject to identifying a target of the at least one remote memory access instruction is not ready; and
    executing at least some of the sequence of other instructions in response to receiving the exception signal.

6. The apparatus of claim 1, wherein the sequence of other instructions comprises at least one test instruction for accessing the remote memory access processing circuitry; and
    wherein the at least one hardware processor is further configured for executing at least some of the sequence of other instructions subject to a result of executing the at least one test instruction.

7. The apparatus of claim 1, wherein the outcome value is encoded to comprise an identification value indicative of at least one remote memory access request executed using the at least one remote memory access instruction; and
    wherein the at least one hardware processor is further configured for:
        extracting the identification value from the outcome value; and
        executing the at least one completion instruction comprising performing the second access to the remote memory access processing circuitry according to the identification value.

8. The apparatus of claim 7, wherein performing the second access to the remote memory access processing circuitry according to the identification value comprises storing in the at least one input-output operand at least one of:
    at least one retrieved value, retrieved from a remote memory component by the remote memory access processing circuitry in response to the first access thereto; and
    at least one input value of the at least one output operand of the at least one remote memory access instruction.

9. The apparatus of claim 1, wherein executing the following instruction is subject to identifying a target of the at least one remote memory access instruction is ready.

10. The apparatus of claim 9, wherein the sequence of other instructions comprises at least one other test instruction for accessing a remote memory access processing circuitry; and
- wherein identifying the target of the at least one remote memory access instruction is ready is according to an outcome of executing the at least one other test instruction.

11. A method for executing a software program comprising a plurality of basic blocks, comprising:
- identifying in a plurality of computer instructions at least one remote memory access instruction, and a following instruction following the at least one remote memory access instruction, where the at least one remote memory access instruction comprises at least one output operand for storing an outcome value, where the outcome value is an outcome of a first access to a remote memory access processing circuitry;
- executing after the at least one remote memory access instruction a sequence of other instructions, where the sequence of other instructions comprises a return instruction to execute the following instruction and at least one completion instruction associated with the at least one remote memory access instruction and comprising at least one input-output operand for receiving at least one input value and for storing another outcome value, where the other outcome value is an outcome of a second access to the remote memory access processing circuitry;
- providing the outcome value as input to the at least one completion instruction via the at least one input-output operand; and
- executing the following instruction;
- wherein executing the sequence of other instructions comprises executing an updated plurality of computer instructions produced by at least one of:
  - inserting into the plurality of computer instructions the sequence of other instructions or at least one flow-control instruction to execute the sequence of other instructions; and
  - replacing the at least one remote memory access instruction with at least one non-blocking memory access instruction.

* * * * *